United States Patent
Zhang

(10) Patent No.: US 8,773,536 B1
(45) Date of Patent: Jul. 8, 2014

(54) LINEAR SYSTEM BASED, QUALITATIVE INDEPENDENT MOTION DETECTION FROM COMPRESSED MPEG SURVEILLANCE VIDEO

(75) Inventor: Zhongfei Zhang, Vestal, NY (US)

(73) Assignee: The Research Foundation for The State University of New York, Binghamton, NY (US)

( * ) Notice: Subject to any disclaimer, the term of this patent is extended or adjusted under 35 U.S.C. 154(b) by 0 days.

(21) Appl. No.: 13/448,519

(22) Filed: Apr. 17, 2012

Related U.S. Application Data

(63) Continuation of application No. 12/569,828, filed on Sep. 29, 2009, now Pat. No. 8,164,629, which is a continuation of application No. 10/364,011, filed on Feb. 12, 2003, now Pat. No. 7,595,817.

(51) Int. Cl.
  *H04N 7/18* (2006.01)
(52) U.S. Cl.
  USPC .......................................... 348/155; 348/144
(58) Field of Classification Search
  USPC .......................................... 348/144, 152, 155
  See application file for complete search history.

(56) References Cited

U.S. PATENT DOCUMENTS 7,003,156 B1 * 2/2006 Yamamoto et al. ........... 382/181

OTHER PUBLICATIONS

Zhongfei Zhang; Weiss, R.; Hanson, A.R., "Qualitative obstacle detection," Computer Vision and Pattern Recognition, 1994. Proceedings CVPR '94., 1994 IEEE Computer Society Conference on , vol., No., pp. 554,559, Jun. 21-23, 1994 doi: 10.1109/CVPR.1994.323881 keywords: {computer vision;motion estimation;performance;qualitative obstacle detection;simula.*
Zhongfei Zhang; Weiss, R.; Hanson, A.R., "Obstacle detection based on qualitative and quantitative 3D reconstruction," Pattern Analysis and Machine Intelligence, IEEE Transactions on , vol. 19, No. 1, pp. 15,26, Jan. 1997 doi: 10.1109/34.566807 keywords: {image reconstruction;mobile robots;noise;object detection;robot vision;continuous ground plane est.*
Carlo Tomasi; Takeo Kanade; "Shape and Motion from Image Streams under Orthography: a Factorization Method"; Computer Vision, International al Journal of, 1992; vol. 9:2m oo 137-154.*

* cited by examiner

*Primary Examiner* — Jeremaiah C Hallenbeck-Huber
(74) *Attorney, Agent, or Firm* — Steven M. Hoffberg; Ostrolenk Faber LLP

(57) ABSTRACT

The present invention features a qualitative method to detect independent motion revealed in successive frames of a compressed surveillance MPEG video stream using linear system consistency analysis without decompression of the stream, identifying the segments containing independent motion in a real-time or faster manner, for the retrieval of these segments. The linear system is constructed using the macroblocks of MPEG compressed video frames. The normal flow value of the macroblock is obtained by taking the dot product between the macroblock gradient vector, computed by averaging the four block gradient vectors, and the motion vector of this macroblock. The normal flow value is filtered for inclusion in the linear system, and the statistic of the matrices of the resulting linear system is determined, filtered to screen out false negatives and outliers, and used to determine the presence or absence of independent motion.

20 Claims, 10 Drawing Sheets

CAMERA MOTION

LINEAR SYSTEM BASED, QUALITATIVE INDEPENDENT MOTION DETECTION FROM COMPRESSED MPEG SURVEILLANCE VIDEO

CROSS REFERENCE TO RELATED APPLICATIONS

The present application is a Continuation of U.S. patent application Ser. No. 12/569,828, filed Sep. 29, 2009, now U.S. Pat. No. 8,164,629, issued Apr. 24, 2012, which is a continuation of U.S. Ser. No. 10/364,011, filed Feb. 12, 2003, now U.S. Pat. No. 7,595,817, issued Sep. 29, 2009, the entirety of which is expressly incorporated herein by reference.

BACKGROUND OF THE INVENTION

1. Field of the Invention

This invention pertains to methods to screen out, from video surveillance data, instances of independent motion (i.e., motion other than camera motion) and, particularly, to a method to perform screening in a real-time or faster than real-time manner from compressed video streams.

2. Discussion of the Related Art

An object in motion from a surveillance video may be interpreted as a potential activity of concern. In domestic law enforcement and security, and in military/intelligence applications, a large motion in the video may be related to activities such as attempts to access secure facilities, military maneuvers, deployment of equipment and personnel, and similar activities.

If the camera is still, the problem of automatic detection of motion from the video is trivial. However, in many applications, it is not possible to have a still camera. An example is the U.S. military unmanned aerial vehicles (UAVs) in 1995, flying over an area in Bosnia for military surveillance purposes. The goal of the surveillance was to detect any military maneuvers in that area, which were typically manifested as target motion in the video. Since in this case the cameras were also in motion, the problem of detecting any target motion was consequently translated to the problem of detecting independent motion, IM: motion other than the camera motion.

Due to large scale, automatic data collection (multiple UAVs in 24 hours, nonstop data collection), the data volume was very large. The surveillance analysis at that time required a great deal of manpower to manually review all the data in order to extract those video shots that contained independent motion for further intelligence analysis. Manual detection of independent motion was found to be extremely tedious, very expensive, and very difficult to perform in a timely manner. Consequently, a detection method, working directly with video data in real-time or even in faster than real-time, would have been very desirable.

When a surveillance video is taken from a camera that is also in motion, every pixel in a frame may contain motion. For the background pixels, the motion reflected in the image domain corresponds to 3D camera motion. On the other hand, for the pixels corresponding to independently moving objects in the frame, their motion corresponds to the combination of the 3D camera motion and their own independent motion in the 3D space. In this case, simple frame based differencing does not work, and sophisticated techniques must be applied to separate the independent motion from the camera motion, called the background motion. This problem becomes even more complicated when 3D motion parallax occurs between two frames. In this case, a 3D motion model must be applied in order to robustly and accurately separate the independent motion from the camera motion. Therefore, the problem of detection of independently moving objects is reduced to the problem of independent motion detection.

Two possibilities related to independent motion detection include:

a) given a video sequence, quantitative independent motion detection, using temporal segmentation of those sub-sequences (called shots) that contain the scene, in which at least one independently moving object is present, and using spatial segmentation and delineation of each of the independently moving objects in each of the frames of these shots; and b) qualitative independent motion detection, which, in contrast, refers to only the temporal segmentation of the video sequence to return those shots that contain independent motion and does not use spatial segmentation to identify the independently moving objects in each frame.

The objective of the qualitative independent motion detection of this invention is, using the example of the U.S. military surveillance in Bosnia, to eliminate the painstaking and tedious effort to manually search the very large amounts of video data to detect those shots containing independent motion, since the majority of the video does not have independent motion. Automatic detection can be performed of the relatively few shots with independent motion. Thus the objective is qualitative independent motion detection from the temporal sequence of the video, as opposed to quantitative independent motion detection in all the frames.

Motion analysis has been a topic in computer vision and image understanding research for many years. Independent motion analysis deals with multiple motion components simultaneously, and therefore is presumably more challenging.

Some of the several methods to accomplish independent motion detection include:

a solution assuming the camera was under translation;

a solution assuming the availability of optical flow, using the flow to group regions on the basis of the rigidity constraint over two frames;

methods based on velocity constraints to detect independently moving objects;

a method based on the rigidity constraint;

a statistical regularization solution using a Markov Random Field model;

using robust statistical regression techniques to detect independent motion;

using geometric constraints for independent motion segmentation;

a solution based on normal flow field, the spatio-temporal derivatives of the image intensity function, as opposed to the typical optical flow field;

a three-frames constraint based on a general 3D motion parallax model to detect independent motion;

using stereo camera streams to detect independent motion by using the combination of applying the normal flow field to the stereo streams and using robust statistical regression;

using a low-dimensional projection-based method to separate independent motion using the epipolar structure of rigid 3D motion flow fields;

a method based on model selection and segmentation for separating multiple 3D motion components;

a solution to the problem in a special case in which the scene may be approximated as a plane, which is valid for typical aerial surveillance, based on spatio-temporal intensity gradient measurements to compute an exact background motion model directly where independent motion is detected based on the constraint violation for the mosaics developed over many frames; and a method that simultaneously exploits both constraints of epipolar and shape constancy over multiple frames, based on the previous work on plane-plus-parallax decomposition explicitly estimating the epipolar and the homography between a pair of frames.

Most of the existing techniques for independent motion detection are quantitative. Due to this fact, few, if any, of them can accomplish real-time detection, as quantitative segmentation in each frame to identify independently moving objects is always computationally expensive. While quantitative detection is useful in general, a qualitative method can be most appropriate. This is because in the military, intelligence, as well as law enforcement applications, time is an important or critical factor. The qualitative method of the invention saves time as the spatial segmentation in the image domain in each frame is avoided, which saves extra computation.

Moreover, it is not necessary to use a quantitative method in these applications. Even if the independently moving targets are all segmented and identified in each frame using the quantitative methods, computer vision and artificial intelligence are inadequate to attain fully automated capability to interpret whether the segmented and identified independent motion in the frames is of any military or intelligence significance without human experts' interaction. Therefore, these detected shots must be left to the image analysis personnel for further analysis.

An additional observation is that in prior work, most of the existing techniques for independent motion detection are based on image sequences, as opposed to compressed video streams. In other words, given a video, such as a surveillance video, these methods require that the video must be first decompressed fully to recover an image sequence before these methods are used. This restriction significantly hinders these techniques from practical applications, because information volume continues to grow, particularly in security and intelligence applications where the data volume is massive, and the video data must be stored in a compressed form, such as that of the ISO/IEC 13818-2 MPEG standard. The ISO 13818-2 MPEG standard describes a system known as MPEG-2 for encoding and decoding digital video data. Digital video data is encoded as a series of code words in a manner that causes the average length of the code words to be much smaller than would be the case.

SUMMARY OF THE INVENTION

In accordance with the present invention there is provided a completely qualitative method to detect independent motion operating directly on the compressed surveillance video in real-time. This qualitative method is based on linear system consistency analysis, and consequently is called qualitative linear system consistency analysis (the inventive method). Since the inventive method focuses only on what is exactly and minimally necessary in order to deliver a solution, the computation is minimized with maximum efficacy. As compared with the existing techniques and available technologies for detecting independent motion, the inventive method has the following distinctive improvements:

a) no camera calibration is required or necessary; image coordinates directly from the video frame may be used without converting them into calibrated coordinates;

b) the statistics computed in the algorithm are very stable due to the low condition number of the matrices, resulting in avoiding the unstable matrix computation problem of high condition numbers typically existing in many computer vision and image understanding techniques;

c) no specific motion model is assumed, the inventive method is able to detect independent motion for any motion models, either planar or parallax motion, or either dense parallax or sparse parallax camera motion;

d) the inventive method is able to detect independent motion based on only two frames, as opposed to other techniques requiring multiple frames;

e) due to the qualitative nature, the inventive method complexity is very low, thus enabling real-time or even faster than real-time detection of independent motion;

f) the inventive method works directly on the MPEG compressed data, it does not need to completely decompress video before applying the detection method; and g) the inventive method requires only one camera video stream to detect independent motion, as opposed to other techniques that require stereo video streams.

BRIEF DESCRIPTION OF THE DRAWINGS

A complete understanding of the present invention may be obtained by reference to the accompanying drawings, when considered in conjunction with the subsequent detailed description, in which.

DETAILED DESCRIPTION OF THE PREFERRED EMBODIMENT

Figure 1A:
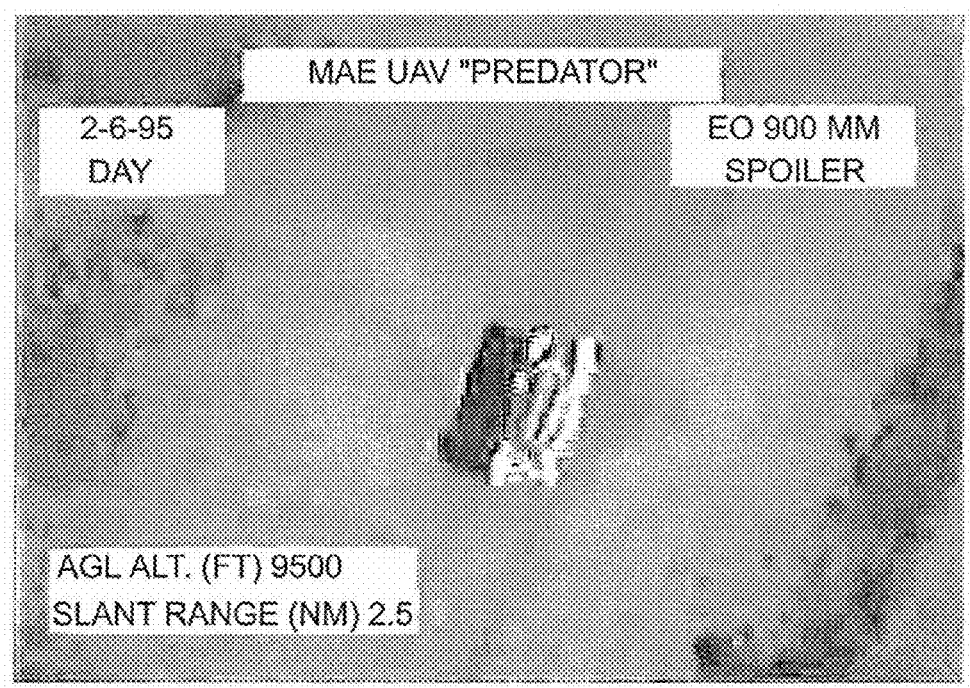
FIG. 1 is an example of two video shots, one with independent motion and one without independent motion, and their accompanying R statistics.
Figure 1B:
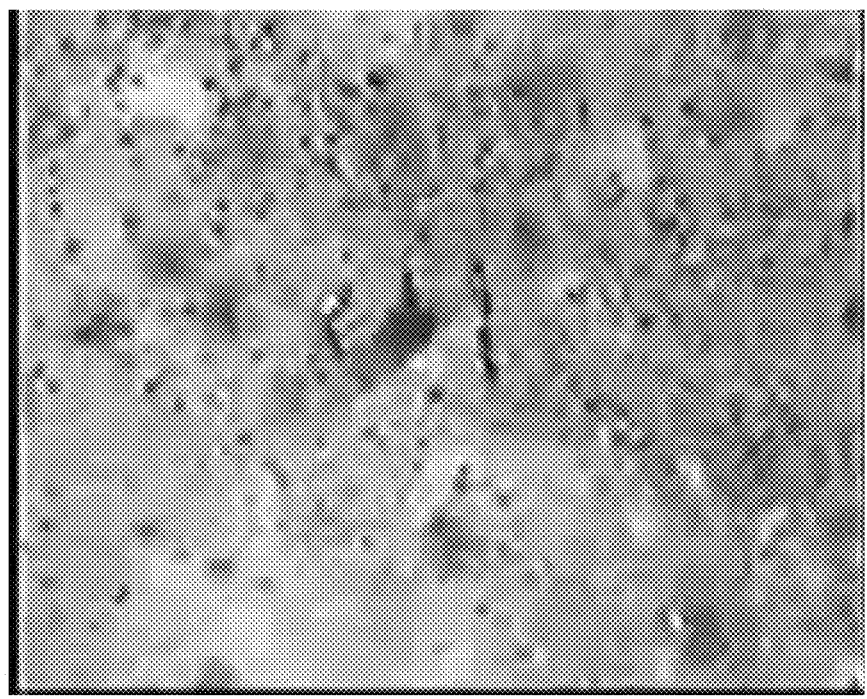
Figure 1C:
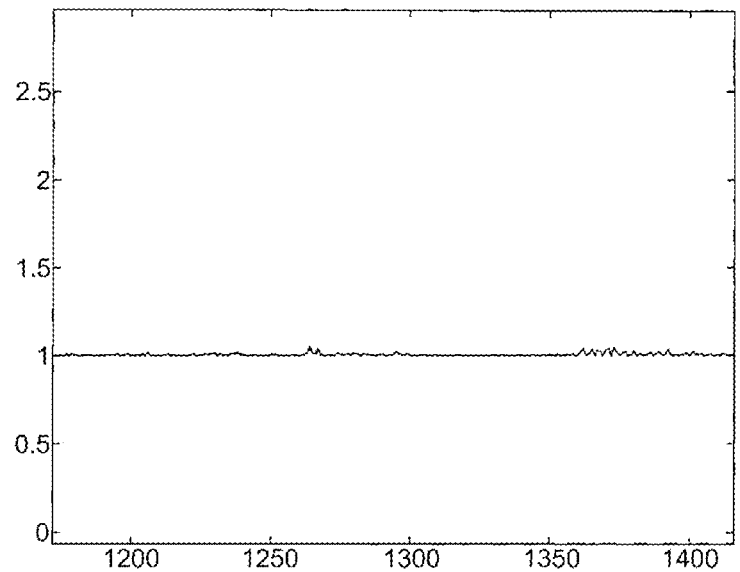
Figure 1D:
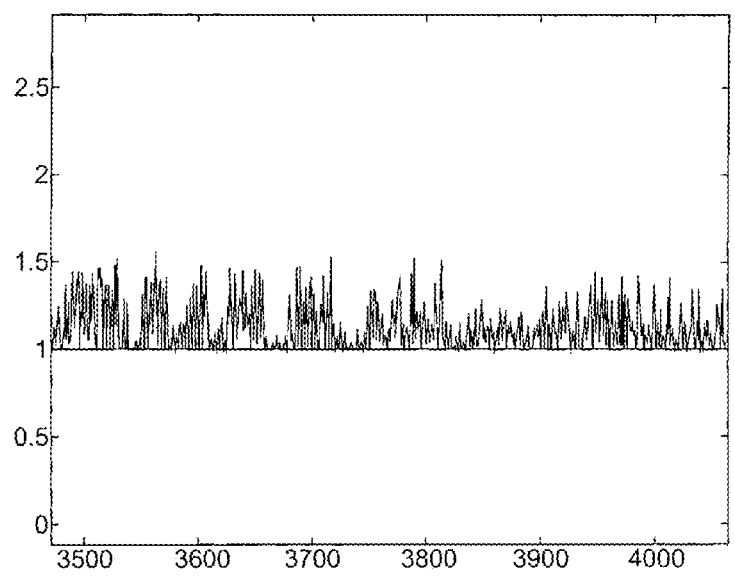

The present invention provides a qualitative linear system consistency analysis, using a 3D to 2D affine model to approximate the video camera imaging system. The linear system is a set of linear equations, expressions of variables in the first degree, i.e., including unknowns only with an exponent of one, later here shown as matrices, and operated upon with the ordinary techniques of linear algebra. An affine model is a transformation that requires lines parallel before transformation remain parallel after transformation. For typical surveillance video streams consisting of successive frames, this affine model is sufficient to model the mapping from 3D scene to 2D images. This model works well even for many non-surveillance video streams such as movies.

Given a 3D point P and its corresponding 2D point p, a 3D to 2D affine transform is a linear transform, and is defined as:

$$p = AP + t \qquad \text{Eq. (1)}$$

where A is a 2 by 3 matrix with six independent parameters, and t is a 2D vector with another two independent parameters.

Assuming that the camera motion between arbitrary two successive frames is an arbitrary 3D motion, which can be represented as a 3 by 3 rotation matrix R with three independent parameters, and a 3D translation vector T with another three independent parameters, $$P'=RP+T \qquad \text{Eq. (2)}$$

where P' is the same point P after the camera motion in the 3D space. The displacement of the point P in the 3D space after the motion is:

$$\dot{P}=P'-P=(R-I)P+T \qquad \text{Eq. (3)}$$

where I is the identity matrix. From Eq. 1 and Eq. 3, it is clear:

$$\dot{p}=A\dot{P}=A(R-I)P+AT \qquad \text{Eq. (4)}$$

Letting $P=(X, Y, Z)^T$ and $p=(x, y)^T$, given each image point p, Eqs. 4 and 1 give rise to four independent equations. Eliminating P, a linear constraint for each image point p in a video frame is obtained:

$$\dot{x}+\theta\dot{y}+\beta y+\gamma=0 \qquad \text{Eq. (5)}$$

where the variables $\alpha$, $\beta$, $\gamma$, and $\theta$ are functions of both the motion parameters R, T between the two frames, and the 3D to 2D affine transform parameters A, t, with the following relationship:

$$\alpha = \frac{f(m_{ij})}{g(m_{ij})} \qquad \text{Eq. (6)}$$

where $m_{ij}$ are the motion parameters (the elements of R and T) and/or the affine parameters (the elements of A and t), and f, g are both quadratic functions. Similar expressions exist for $\alpha$, $\gamma$, and $\theta$ When any two frames are determined, the motion parameters R, T are constants for all the image points in the frames. First assuming that the affine transform parameters A, t are always constants (later relaxing this assumption), the variables $\alpha$, $\beta$, $\gamma$, and $\theta$ are independent of the image coordinates x, y, and their derivatives $\dot{x}$, $\dot{y}$ in Eq. 5. This indicates that for each point in a frame, there is a linear constraint represented in Eq. 5.

Assuming that n points are identified in a frame, and that each point's displacement to another frame is known $(\dot{x}, \dot{y})^T$, since each point contributes one linear constraint of Eq. 5, a linear system consisting of these n points exists:

$$D\xi = b \qquad \text{Eq. (7)}$$

where $$D = \begin{pmatrix} 1 & \dot{y}_1 & x_1 & y_1 \\ \ldots & & & \ldots \\ 1 & \dot{x}_1 & x_n & y_n \end{pmatrix}$$

$$\xi = \begin{pmatrix} \gamma \\ \theta \\ \alpha \\ \beta \end{pmatrix} \qquad \text{Eq. (8)}$$

$$b = \begin{pmatrix} -x_1 \\ \ldots \\ -x_n \end{pmatrix}$$

Given such a linear system, if all the n points are coincident with the camera motion, i.e., no independent motion with any of these n points, then all the n points have the same motion parameters. Since the affine parameters are always the same for all the points, the n points will have the same values $\alpha$, $\beta$, $\gamma$, and $\theta$ based on Eq. 6. Therefore, the linear system Eq. 7 is consistent, and therefore there are solutions to this system. Thus given n points represented in the linear system in Eq. 7, if there is no independent motion with any of these points, the linear system is consistent.

This means that the consistency of the linear system is the necessary condition of no independent motion in the n points. In general, given n>4, the rank of D is 4. Consequently, in general the consistency of Eq. 7 means there is a unique solution for this linear system. It is obvious that if the linear system Eq. 7 is not consistent, there must be independent motion involved. However, the linear consistency of the system Eq. 7 is not the sufficient condition for detecting any independent motion of the n points. This is due to the fact that Eq. 6 is not a one to one mapping between a specific vector of $\xi$ and a specific set of motion parameters. Given the same solution $\xi$ for all the n points, it is possible to have different values of motion parameters that satisfy the same constraint of Eq. 6.

Figure 2:
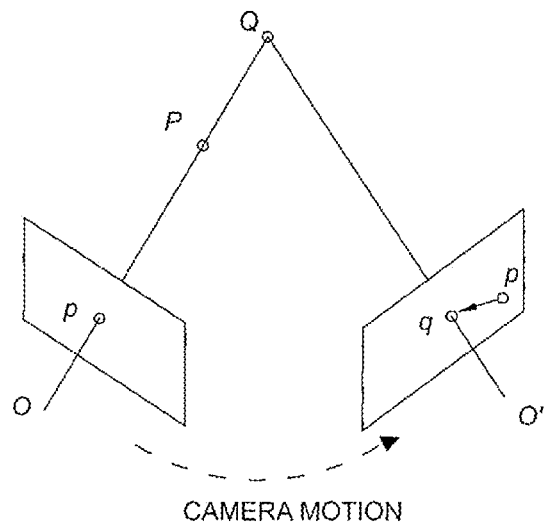
FIG. 2 is schematic depiction of camera motion.

Referring now to FIG. 2, there is shown one example of this situation. In this example, the camera moves from the position O at time $t_1$ to the position O' at time $t_2$ with a different orientation. If a 3D point Q does not involve any independent motion between $t_1$ and $t_2$, then the corresponding images of Q at these two instants are p and q, respectively. Thus, the displacement between the two frames for Q in the image domain is q-p. If another 3D point P is located somewhere in the ray between P and O at time $t_1$, however, then the image of P is the same p as that of Q. When the camera moves from O to O', P undergoes an independent motion to Q. Consequently, the combined motion of P results in the same displacement vector q-p in the image domain. This means that given the same displacement vectors, together with the same points in one frame, subsequently resulting in the same vector from Eq. 7, it cannot be determined whether there is independent motion involved. Hence, the linear system consistency is not a sufficient condition for detecting the absence of independent motion.

Though the consistency of the linear system Eq. 7 is only the necessary condition and not the sufficient condition to determine whether any independent motion is involved in the n point set, it can be used to detect the independent motion qualitatively. In fact, if the linear system is not consistent, it can be immediately concluded that independent motion occurred between the two frames. On the other hand, if the linear system is consistent, it can be presumed that no independent motion occurred. This presumption is subject to a potential false negative, as the linear consistency is not the sufficient condition for independent motion detection. Similarly, if a large computation noise occurs (e.g., the image point localization errors, the displacement vector estimation errors), a consistent linear system could turn out to be inconsistent. In this case, a false positive would be generated. In general, in practical applications, a few false positives can be allowed while false negatives must be minimized.

By linear algebra theory, Eq. 7 is consistent if and only if $$\text{Rank}(D)=\text{Rank}(Db) \qquad \text{Eq. (9)}$$

where Kb is the augmented matrix of Eq. 7.

In order to calculate the rank of the above two matrices, singular value decomposition (SVD) is applied to both D and Db, defining $$R = \frac{\sigma_{min}(D)}{\sigma_{min}(Db)} \quad \text{Eq. (10)}$$

where $\sigma_{min}(D)$ and $\sigma_{min}(Db)$ stand for the smallest singular values of D and Db, respectively, assuming Eq. 7 has unique solution if it is consistent; multiple solution cases may be handled similarly. Rank is defined such that a matrix A is of rank r if it contains at least one square submatrix of order r with a non-zero determinant, while the determinant of any square submatrix having (r+1) or higher order, possibly contained in A, is zero. Consequently, Eq. 7 is consistent if and only if R is above a threshold. Therefore, the problem of qualitative independent motion detection is reduced to determining the value of R defined in Eq. 10 for the linear system Eq. 7. Note that from the definition of Eq. 10, R≥1.

With regard to the computation of the linear consistency of Eq. 7:

a) the 3D to 2D affine transform Eq. 1 does not assume the calibration of the camera, and this allows the use of uncalibrated image coordinates $x_i$, $y_i$ in the linear system Eq. 7, and allows the use of any arbitrary 2D Cartesian system as image coordinates; and b) the coefficients of the linear system Eq. 7 are all linear terms of $x_i$, $y_i$, $\dot{x}_i$, $\dot{y}_i$, eliminating the common and notorious problem of high condition numbers in linear systems, typically existing in many image understanding problems that makes the solutions unstable, and this property indicates that the R statistic determined in Eq. 10 is stable, which has been confirmed.

Eq. 7 assumes the availability of displacement vectors $(\dot{x}, \dot{y})^T$ for a group of image feature points in a frame. In order to obtain the displacement vectors, in general, a correspondence method or an optical flow method must be applied. If the two frames selected are consecutive frames, it can be assumed that the motion between the two frames is small. In this case, a more efficient, more reliable, and more attention-focused feature detection and tracking method may be used to generate the displacement vectors between the two frames. Nevertheless, since the correspondence problem is an ill-posed problem in computer vision and image understanding research, even for these more reliable methods, false positives and false negatives in terms of the correspondence errors between the two frames are inevitably possible, which will be propagated to false positives and false negatives in independent motion detection. Consequently, it is desirable to have a linear system method independent of any specific correspondence methods or optical flow methods for computing the displacement vectors. The inventive method provides this solution.

In addition, the current linear system Eq. 7 assumes the availability of two static images, as opposed to two video frames. Video frames are typically stored in compressed data based on a specific video format such as MPEG, unless they are explicitly decompressed to become static images. Therefore, the linear system method is directly based on compressed video data.

Using the MPEG standard, and recalling Eqs. 4 and 1, applying them to every point of a region with m points, instead of applying them to a set of feature points in a frame, $$\sum_{i=1}^{m} \dot{p}_i = A(R-1)\sum_{i=1}^{m} P_i + ^m AT \quad \text{Eq. (11)}$$

and $$\sum_{i=1}^{m} \dot{p}_i = \sum_{i=1}^{m} P_i + ^m t \quad \text{Eq. (12)}$$

and defining $$\overline{p} = \frac{1}{m}\sum_{i=1}^{m} pi = (\overline{x}, \overline{y})^T;$$

$$\overline{\dot{p}} = \frac{1}{m}\sum_{i=1}^{m} \dot{p}_i = (\overline{\dot{x}}, \overline{\dot{y}})^T; \overline{P} - (\overline{X}, \overline{Y}, \overline{Z})^T$$

The following equations are obtained:

$$\overline{\dot{p}} = A(R-I)\overline{P} + AT \quad \text{Eq. (13)}$$

$$\overline{\dot{p}} = \overline{AP} + t \quad \text{Eq. (14)}$$

Taking an MPEG macroblock as each such region, then m becomes a constant (under the MPEG standard, m=256) over the whole frame. The ISO 13818-2 MPEG standard describes a system known as MPEG for encoding and decoding digital video data, and in this system, encoded pictures are made up of pixels. Each 8×8 array of pixels is known as a block, and a 2×2 array of blocks is known as a macroblock. It should be understood, this is the preferred embodiment, other numbers of pixels and blocks can be used to achieve this result. Therefore, a similar linear constraint for each macroblock of a frame exists:

$$\overline{\dot{x}} + 0\overline{\dot{y}} + \alpha\overline{x} + \beta\overline{y} + \lambda = 0 \quad \text{Eq. (15)}$$

and consequently, given n macroblocks, a similar linear system can be constructed:

$$D_m = \xi_m b_m \quad \text{Eq. (16)}$$

such that given n macroblocks in a video frame represented in the linear system in Eq. 16, if there is no independent motion with any of these macroblocks, then the linear system is consistent.

In the MPEG compression standard, for each macroblock in a frame, if this macroblock is inter-coded, there is a motion vector available. Approximating $\overline{\dot{p}}$ with the motion vector, p is the center of the macroblock. Since the macroblock information (including the motion vector and the center coordinates) can be easily obtained directly from a compressed MPEG video stream, a linear system, Eq. 16, exists that can directly work on the MPEG compressed data without having to depend on a specific method to compute the correspondence or optical flow between the two frames, eliminating the two potential difficulties mentioned above with Eq. 7. If the macroblock is intra-coded, we just excluded this macroblock from the linear system Eq. 16. If the frame is an I frame in which all the macroblocks are intra-coded, from Eqs. 15, 16, and 10, R=1. This could be a false positive, which can be easily removed by filtering the R statistics, resulting in rejection of this false positive in the final detection.

While the motion vector of a macroblock may approximate the displacement vector, this may create another problem: the accuracy of this approximation. It is known that the motion vector estimation in MPEG is subject to errors, and the size of the errors depends on the specific implementation of the motion vector estimation method under the MPEG standard. In the inventive method, the solution is based on the normal flow computation to lower the potential errors for the motion estimation. Normal flow is more reliable than standard optical flow. Assuming that the intensity function of a frame is I(x, y), the normal flow $n_p$ at the point $p=(x,y)^T$ is defined as the dot product between the gradient of the point p and the displacement vector at this point:

$$n_p = \frac{\partial I}{\partial x}\dot{x} + \frac{\partial I}{\partial x}\dot{y} \qquad \text{Eq. (17)}$$

Since in the compressed MPEG video stream only the motion vectors for each macroblock are available, as opposed to each point, this point-based normal flow definition is extended to the macroblock based one. Let $\nabla I(p)$ be the gradient of the intensity function I at a point p. Given a macroblock M, the macroblock gradient $\nabla I(M)$ is defined:

$$\nabla I(M) = \frac{1}{m}\sum_{i=1}^{m} \nabla I(p_i) \qquad \text{Eq. (18)}$$

where $p_i$ is a point of M, and m is the total number of points in M. In MPEG, m=256.

A method of estimating the approximated gradient for the whole block using low frequency AC coefficients of the DCT (2 dimensional discrete cosine transform) of a block in MPEG has been shown. In order to estimate the block gradient, only a few low frequency AC coefficients are necessary to recover the information. Five coefficients ($AC_{01}, AC_{10}, AC_{20}, AC_{11}, AC_{02}$) may be sufficient. Consequently, the majority of the AC coefficients as well as the DC component are discarded. This shows that it is not necessary to decompress the video stream in order to recover the block gradient. The method can work directly on the compressed MPEG stream to extract the small piece of the "essential" information (i.e., the motion vector of a macroblock and the few low frequency AC components of a block) without having to decompress the video stream. Once the block gradient vectors are available for all four blocks of a macroblock, the macroblock gradient is computed by averaging the four block gradient vectors based on the definition. Finally, the normal flow value of a macroblock is defined similarly to that of a point in Eq. 17 by taking the dot product between the macroblock gradient vector and the motion vector of this macroblock.

Once the normal flow value has been computed for a macroblock, a decision can be made as to whether this macroblock should be incorporated into the linear system of Eq. 16. The rationale is that if the normal value is low, the motion vector is probably not accurately estimated, and consequently this macroblock should be rejected, and not evaluated in Eq. 16.

Figure 6:
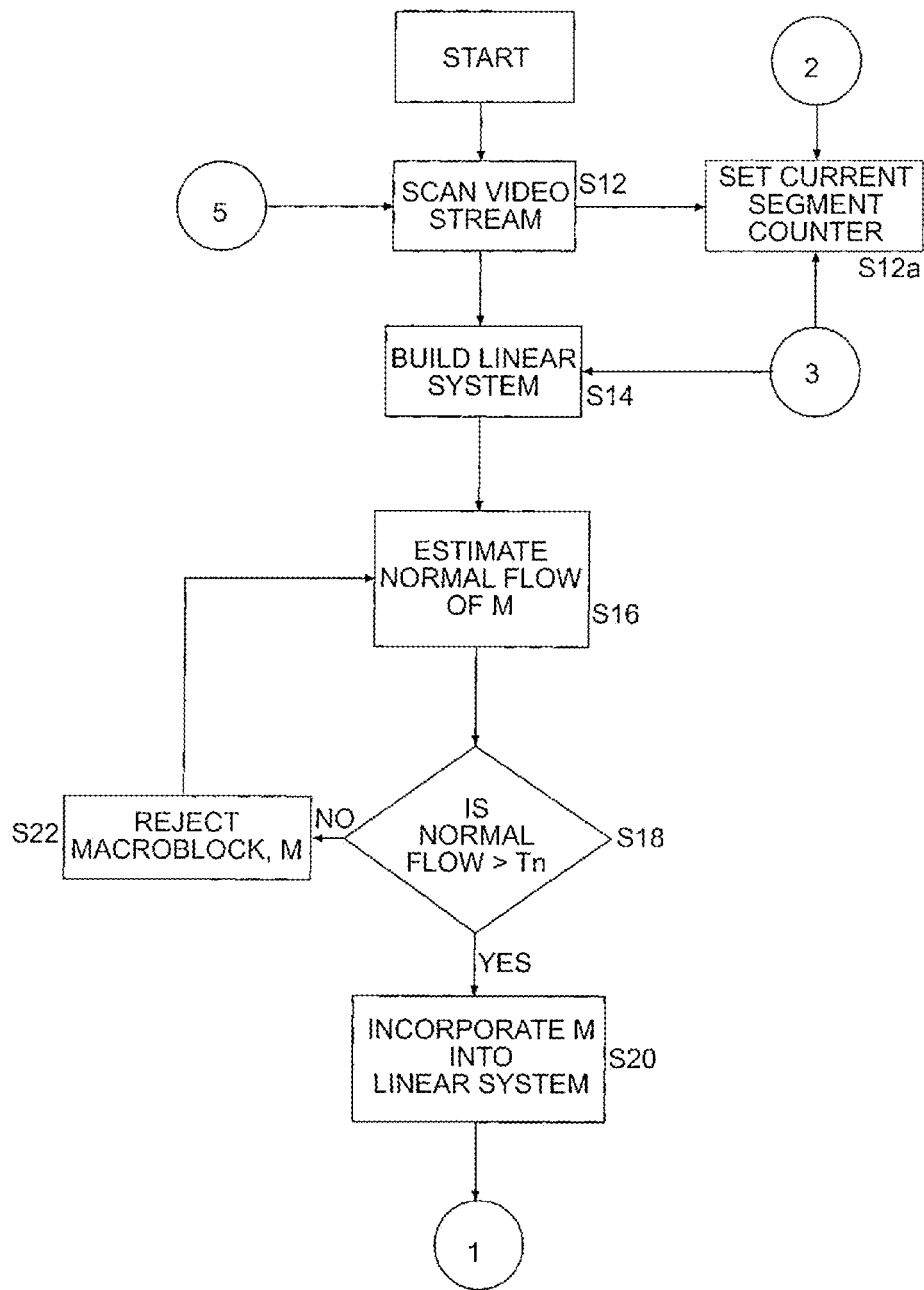
FIGS. 6-8 show a flow chart summarizing the inventive method.
Figure 7:
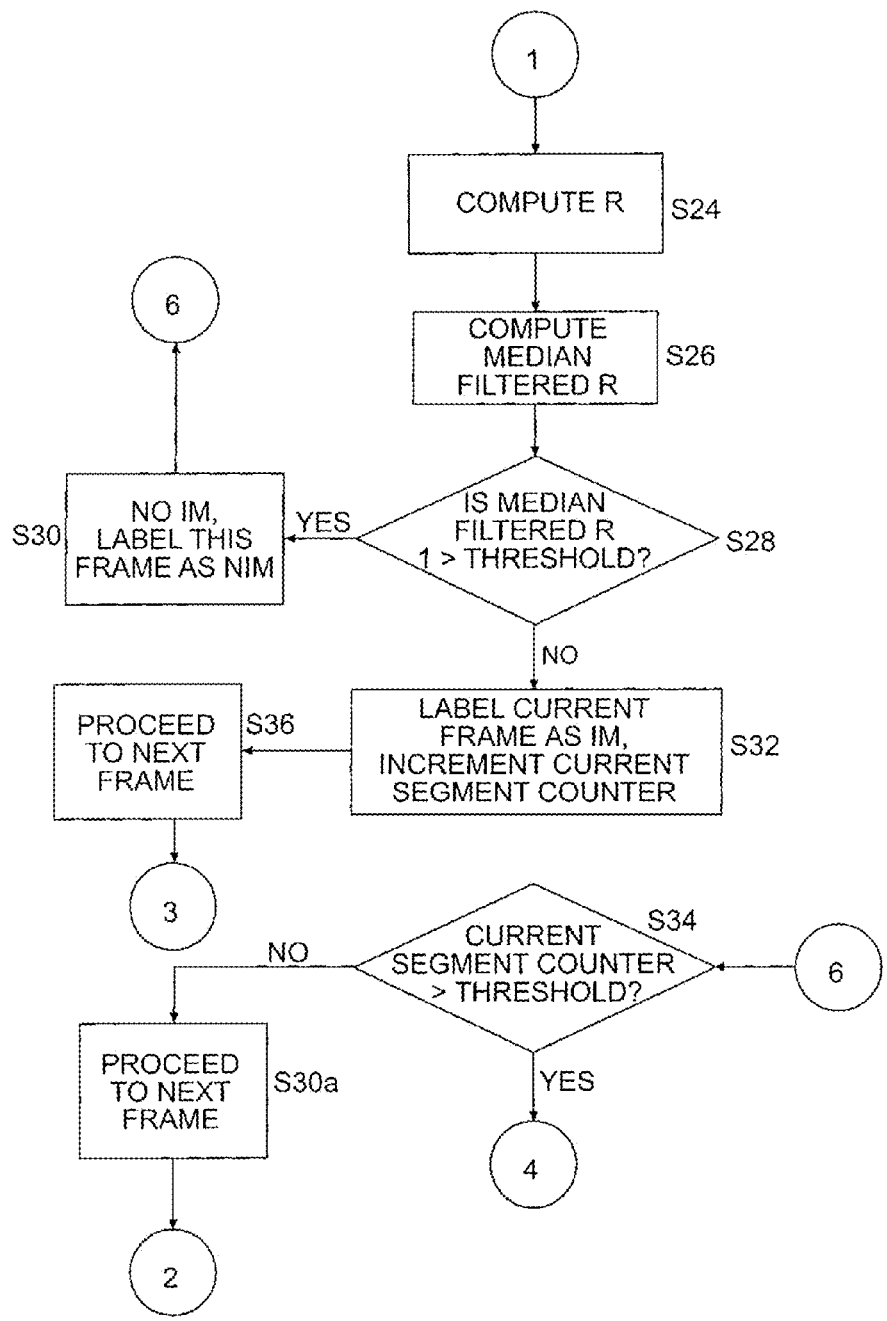
Figure 8:
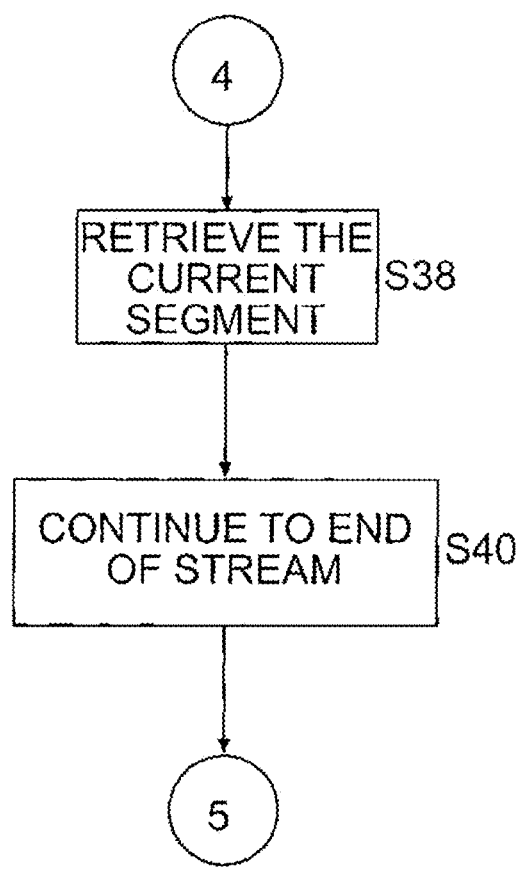

Referring now to FIGS. 6, 7, and 8, there is shown a flow chart 10 of system operations. The inventive method is summarized as follows, using four parameters: the normal flow threshold $T_n$, the scan window width r, the R statistic threshold $T_R$, and the defined minimum number of frames of a segment that contain independent motion $T_f$:

a) Scan an input video stream in compressed MPEG, Step 12;

aa) Set current segment counter=0, step 12a;

b) For every consecutive pair of frames, start to build up the linear system, Eq. 16, Step 14;

c) For each macroblock M of the first frame 1 of the consecutive pair, estimate the normal flow $\nabla I(M)$ of M, Step 16;

d) Determine if the normal flow, $\nabla I(M)$, is greater than $T_n$, the normal flow threshold, Step 18;

e) If yes, incorporate M into the linear system, Eq. 16 based on Eq. 15, Step 20;

f) If no, reject macroblock M, as it is not accurately estimated, and proceed to the next macroblock, Step 22;

g) Compute R of the linear system Eq. 16, Step 24;

h) Compute the median filtered R over the scan window width, r frames, across the surveillance video segment, 1, Step 26;

i) Determine if R−1 is greater than $T_R$, the R statistic threshold, Step 28;

j) If yes, label 1 as no independent motion (NIM), Step 30;

k) If no, label 1 as an IM frame, and increment the current segment counter, Step 32;

l) proceed to build the linear system with the next frame, Step 36;

m) Determine if the segment counter greater than $T_f$, the frame number threshold (the minimum segment containing IM, a filter), Step 34;

n) If yes, retrieve the IM segment as containing significant IM, Step 38; and o) Continue to the end of the video stream, repeating the inventive method above, Step 40.

p) If no, proceed to next frame, step 30a.

Figure 3:
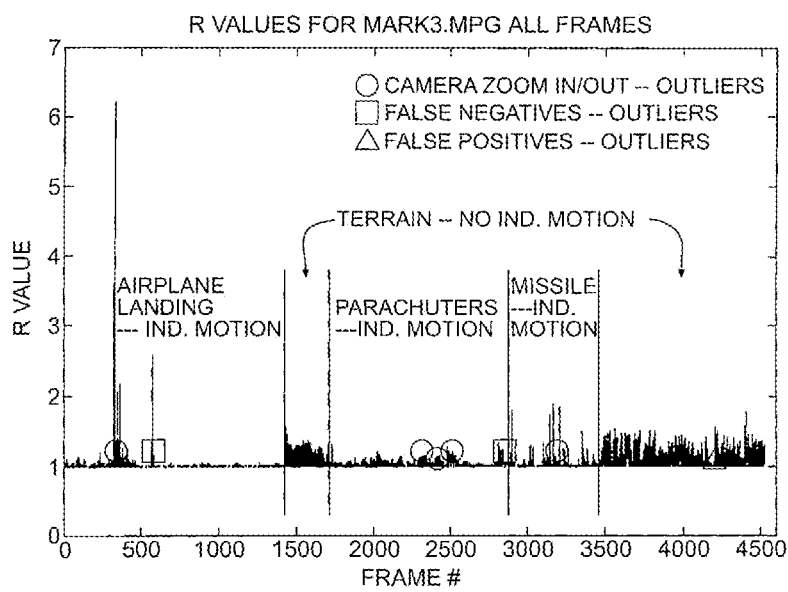
FIG. 3 is a depiction of the R statistics for a whole video, with annotations.

Referring now to FIG. 3, there is shown the original R statistics in another very noisy surveillance video that contains both scenarios of independent motion no independent motion. A noticeable number of outliers are scattered over the 4564 frames of this video. Some of them are due to the change of camera parameters during the surveillance; others are false positives or false negatives, caused by the poor estimation of the motion vectors due to the poor image quality of the video, or even no motion vector such as in an I frame. However, almost all of these outliers are removed after the median filtering of the inventive method, resulting in a very robust detection of independent motion. The inventive method is based on the assumption of a constant camera model in terms of the affine parameter A and t. In real applications, it is possible that the camera internal parameters change during the surveillance (e.g., zoom in/out). Since the inventive method focuses only on two consecutive frames, given the current video frame rate (about 30 frames/second), if the change is slow, the change can be ignored, and the method can be used to compute the R statistic between the two frames; if the change is fast, the computed R value between the two frames may be wrong, which will lead to a false positive or negative. However, in this case, only a few frames are subject to the error of R values, and they are shown as outliers, typically filtered out.

Referring now to FIG. 1, there are shown exemplar frames from the Bosnian surveillance videos that represent two different scenarios: a scene with independent motion and a scene without independent motion. In an implementation environment including a Windows® 2000 platform with Pentium III® 800 MHz CPU 512 MB memory as an example of many such environments known to those skilled in the art, FIGS. 1c and 1d show the original R statistics computed at every frame for the two shots from two surveillance video segments in FIGS. 1a and 1b, respectively. The statistics show whether and where there is independent motion in the video. The first segment containing 1119 frames describes an independent motion of a missile launcher moving to its destination. The mean of the original R is 1.0 and the deviation is 0.00122 over the 1119 frames. The second segment containing 1058 frames surveys an area of ground terrain with no independent motion. The mean of the original R is 1.389 and the deviation is 0.169 over the 1058 frames.

Figure 4A:
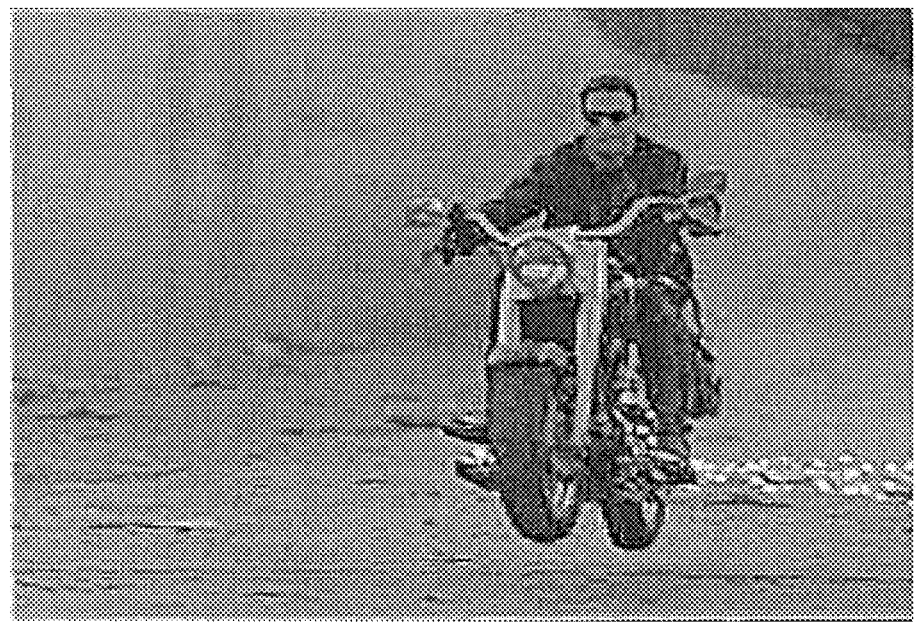
FIG. 4 is a frame of a movie video with median filtered rank, R, for the presence and absence of independent motion.
Figure 4B:
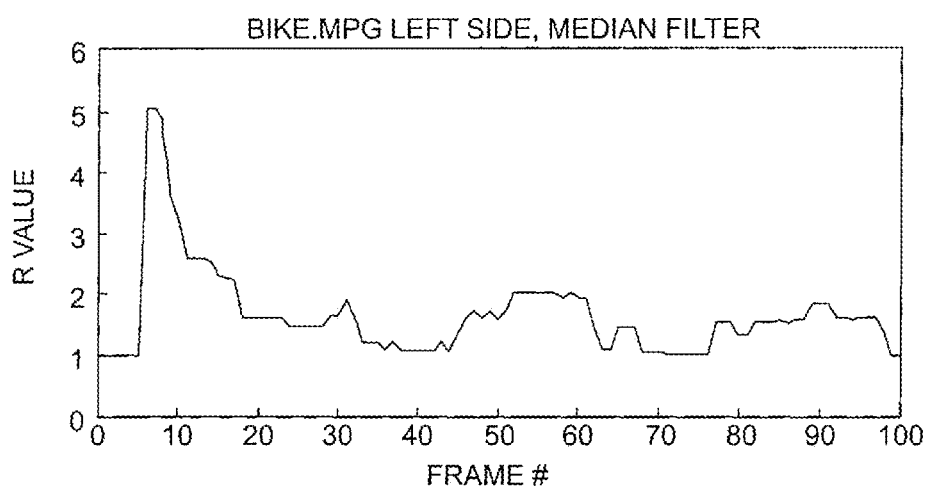
Figure 4C:
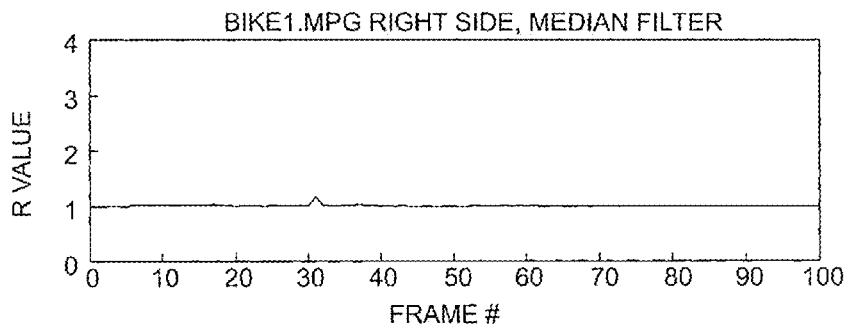

To show that the inventive method is not valid only for the typical surveillance scenario where the camera is far away from the scene, but also valid for the scenario where the camera is relatively close to the scene, referring now to FIG. 4, there is shown an experimental result of the inventive method. A movie with an independent motion very close to the camera is used as the video stream, and split in the spatial domain into the left and right halves such that the left video does not contain the independent motion while the right one does. The result clearly shows that the inventive method is robust even under the situation where the camera is close to the surveillance scene.

Since the inventive method essentially computes the R value for each frame, and since in each frame there is typically a very limited number of macroblocks, the complexity of the inventive method is very low. The inventive method scans a compressed MPEG video with a typical frame resolution of 240 by 350 at the speed of 35 frames per second, which is faster than real-time. This implementation shows proof of concept and the code has not yet been optimized. This shows that the inventive method can provide real time or faster automatic detection of independent motion in surveillance video.

In addition to the two advantages mentioned before (no camera calibration needed and low condition number in the linear system) the inventive method has the following additional advantages:

a) Many independent motion detection techniques in the literature assume the planar motion model, or assume that the independent motion may be approximated by multiple planar 'layers.' If these assumptions are not valid (if 3D parallax motion is involved) many techniques assume 3D scene with dense parallax so that the epipoles may be reliably estimated; if only sparse parallax camera motion is available, other information such as more frames or a reference plane must be available. The inventive method, however, is able to detect independent motion for both planar and parallax motion, and for both dense parallax and sparse parallax camera motion.

b) The inventive method is able to detect independent motion based on only two frames, as opposed to more than two frames required by other methods. This is due to the qualitative nature of the inventive method. Those that require more than two frames typically attempt to do quantitative independent motion detection.

c) Due to its qualitative nature, the inventive method is very fast. The unoptimized implementation runs at 35 frames/second rate with a typical frame resolution of 240×350 of a compressed MPEG video, thus it is certain that after optimization, a more efficient surveillance capability will result.

d) The inventive method directly works on the compressed data without having to first decompress the data completely.

e) The inventive method requires only one camera video stream for robust detection as opposed to the stereo video streams required by some.

Analyses of false positives and false negatives, the sensitivity analysis for the inventive method, can be performed, testing the stability of the statistic R of the inventive method under different levels of noise through simulation. As an example, ten 3D points were randomly generated in a Euclidean world coordinate system. A camera was first located at an arbitrary position in this world coordinate system. The ten 3D points were projected to the image plane of the camera based on the 3D to 2D affine transform to generate the image coordinates in this frame. Then, the camera was moved to another position, and the ten 3D points were projected to the image plane again to generate the image coordinates in the second frame. The image displacement vectors were immediately obtained from the image coordinates of the two frames. The displacement vectors and the image coordinates in the first frame were then corrupted by different levels of randomly generated Gaussian noise, parameterized by different standard deviations in terms of number of pixels. The image points in the two frames were distributed in an area of 100 pixels by 120 pixels. Thus, 1 pixel deviation of Gaussian noise corresponds to approximately 1% of the whole effective image dimension.

The corrupted image coordinates and the displacement vectors were put into the inventive method, and the R statistic was computed for each noise level. Since no independent motion was involved in this scenario, the R value should have been high. Under the corruption of the noise, however, the R value degraded as the noise level increased.

Figure 5A:
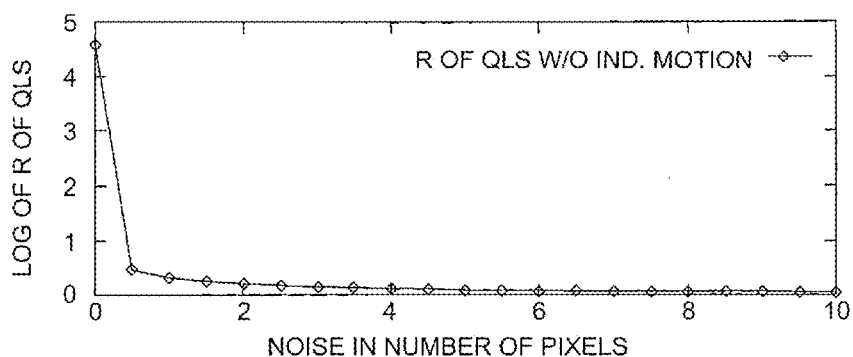
FIG. 5 is an illustration of seven cases, (a) through (g), showing the R statistic of the inventive method under different noise levels and with independent translation and rotation on the X, Y, and Z axes, respectively.
Figure 5B:
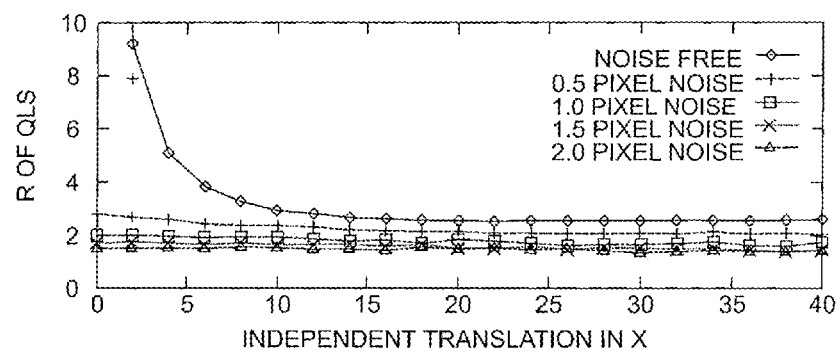
Figure 5C:
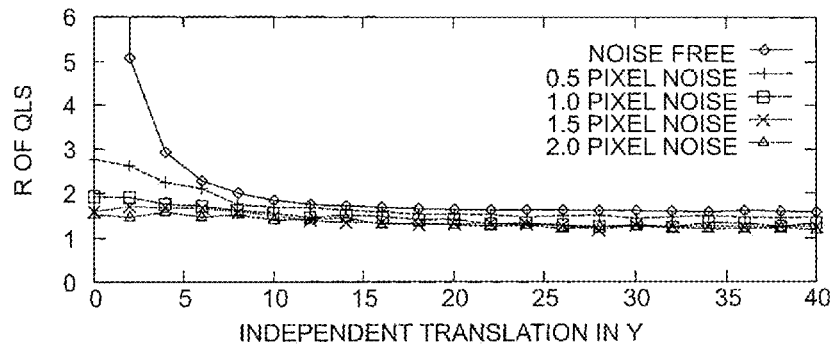
Figure 5D:
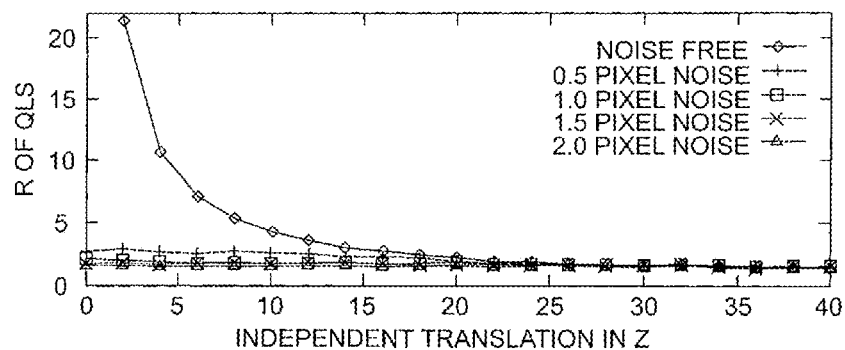
Figure 5E:
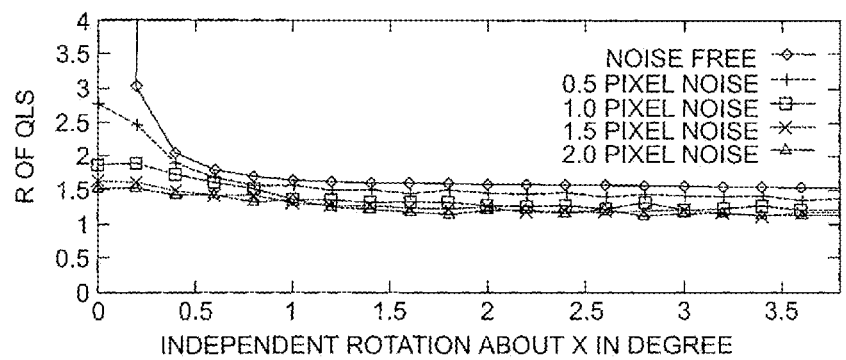
Figure 5F:
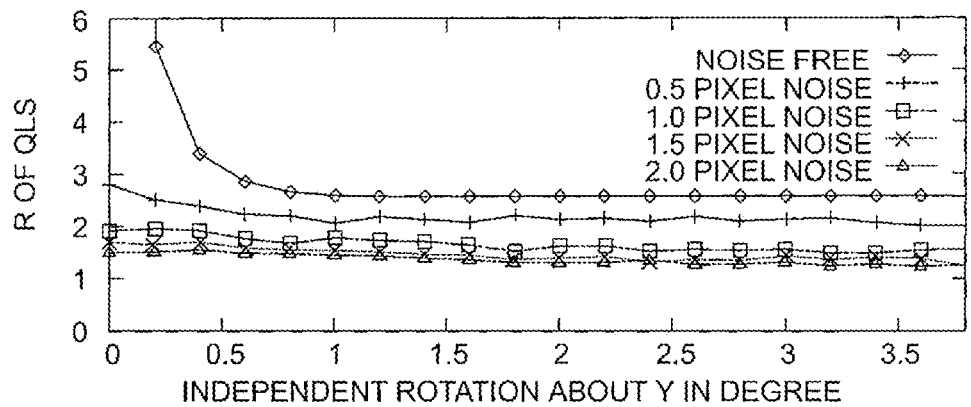
Figure 5G:
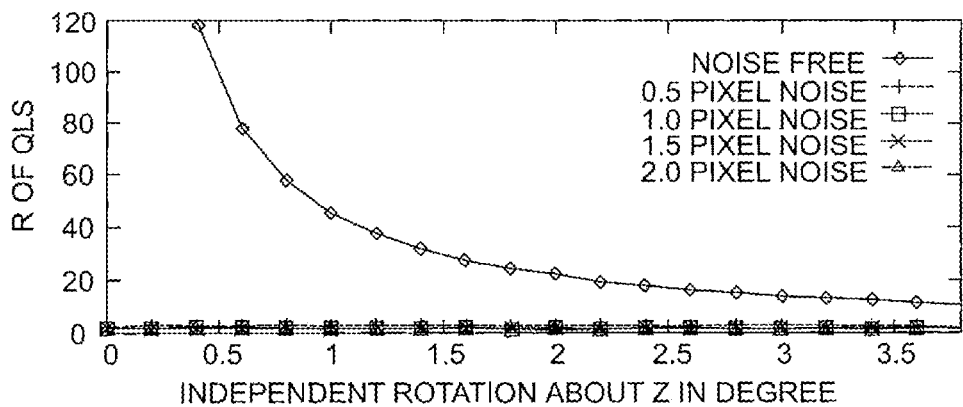

Referring now to FIG. 5a, there is shown the logarithm of the R values averaged over 1000 runs with different seeds under each Gaussian noise level parameterized by standard deviation in terms of number of pixels. From FIG. 5a, it is clear that false positives of independent motion detection may occur when the noise level increases. From FIG. 5a, if the noise level is controlled under two pixels, the $\underline{R}$ value always stabilizes somewhere statistically significantly higher than one. Considering the effective image dimension as 100 by 120, two pixels' noise is significantly large in practice. This demonstrates that the inventive method is very robust in rejecting false positives in independent motion detection.

While probabilities describing false positives and false negatives are the probabilities of an event of a detection failure of the inventive method, detectability is a different but related concept, which is defined as the smallest independent motion that the inventive method can detect. Again, this may be determined through simulation analysis.

Referring now to FIGS. 5b-5g, there are shown six scenarios of an extended simulation. The simulation above was extended as follows: in addition to the ten background points, an eleventh point that is subject to independent motion was added, in addition to the camera motion. Here the R value always stayed at one regardless of the level of the noise. In order to separate contributions of different independent motion components to the detectability of the inventive method, the inventive method was applied to the independent translation of this point along X, Y, Z axes, and to independent rotation of this point about X, Y, Z axes, respectively, under different levels of Gaussian noise.

A qualitative examination of these simulation results reveals that the performance of the inventive method appears more sensitive to independent rotation than to independent translation, and in particular, much less sensitive to the independent motion related to the Z axis (rotation about the axis or translation along the axis) than to the independent motion related to the other axes; quantitatively, based on this simulation, the detectability is related to the noise levels, and a higher noise level increases detectability. The reason is that a higher level of noise increases the false positives, which helps increase detectability.

Using the noise level of 1.5 pixel deviation as an example, if the threshold value for R, $T_R$, of 2 is selected, the detectability is under one unit for all the translations, and under 0.1 degree for all the rotations. If a $T_R$ of 1.5 is selected, the detectability for translations along the X, Y, Z axes is above eight, ten, and twenty units, respectively, and for rotations about X, Y, and Z axes the detectability is above 0.4, 0.8, and 3.0 degrees, respectively.

Since other modifications and changes varied to fit particular operating conditions and environments or designs will be apparent to those skilled in the art, the invention is not considered limited to the examples chosen for purposes of disclosure, and covers changes and modifications which do not constitute departures from the true scope of this invention.

Having thus described the invention, what is desired to be protected by letters patents is presented in the subsequently appended claims.

What is claimed is:

1. A method for detection of independent motion of a plurality of objects presented in a plurality of images acquired at different spatial positions, comprising:
   a) processing each of the plurality of images with an automated processor to generate a respective linear system representing the plurality of objects in the form of a matrix having at least three dimensions stored in a memory;
   b) analyzing a plurality of matrices with an automated processor to qualitatively determine whether there is a unique solution for the plurality of matrices as representing a respective linear system, based on a ratio of a singular value decomposition of a matrix with respect to an associated augmented matrix, wherein:

$$\dot{x}+\theta\dot{y}+\alpha x+\beta y+\gamma=0$$

represents a linear constraint for each point at coordinates (x,y) with derivatives $\dot{x}$, $\dot{y}$, represented in respective images, wherein $\alpha$, $\beta$, $\gamma$, and $\theta$ are functions of both the motion parameters and affine transform parameters between respective images; and
   c) outputting a signal corresponding to the qualitative determination, representing whether or not there is independent motion between the plurality of objects represented in the time sequence of images.

2. The method according to claim 1, wherein:
   the singular value decomposition is applied to both a respective matrix D and a respective corresponding augmented matrix Db, defining $$R = \frac{\sigma_{min}(D)}{\sigma_{min}(Db)}$$

where $\sigma_{min}(D)$ and $\sigma_{min}(Db)$ stand for the smallest singular values of D and Db, respectively.

3. The method according to claim 1, wherein an affine transform is employed in which parallel lines of an object represented in a plurality of the images remain parallel in the linear system after transformation.

4. The method according to claim 1, wherein a change in a perspective of camera acquiring the plurality of images with respect to objects represented in the plurality of images does not lead to a determination of independent motion.

5. The method according to claim 1, wherein a change in relative positions of objects in the plurality of images leads to a determination of independent motion.

6. The method according to claim 1, wherein said plurality of images are received as a stream comprising a time sequence of images, and said processing and said analyzing are performed in at least real time speed with respect to the time sequence.

7. The method according to claim 1, wherein the plurality of images are in an Motion Picture Experts Group 2 (ISO 13818-2) digital video format.

8. The method according to claim 1, wherein the plurality of images are compressed in a digital video format which comprises blocks comprising arrays of image pixels, and macroblocks comprising arrays of the blocks, further comprising estimating a motion parameter from a transformation at least one of said macroblocks over time, without rendering the compressed digital video data as a raster image.

9. The method according to claim 8, further comprising estimating said motion parameters using a normal flow computation, and wherein the normal flow computation is not used in said processing or said analyzing.

10. An apparatus for detecting independent motion of an object represented in a plurality of images acquired at different spatial positions, comprising:
    a) at least one automated processor configured to process each of the plurality of images with an automated processor to generate a respective linear system representing the plurality of objects in the form of a matrix having at least three dimensions, and to store the generated matrix in a memory;
    b) at least one automated processor configured to retrieve a plurality of matrices from the memory, and to analyze a plurality of matrices to qualitatively determine whether there is a unique solution for the plurality of matrices as representing a respective linear system, based on a ratio of a singular value decomposition of a matrix with respect to an associated augmented matrix, wherein:

$$\dot{x}+\theta\dot{y}+\alpha x+\beta y+\gamma=0$$

represents a linear constraint for each point at coordinates (x,y) with derivatives $\dot{x}$, $\dot{y}$, represented in respective images, wherein $\alpha$, $\beta$, $\gamma$, and $\theta$ are functions of both the motion parameters and affine transform parameters between respective images; and
    c) an output port configured to produce a signal corresponding to the qualitative determination, the signal representing whether or not there is independent motion between the plurality of objects represented in the time sequence of images.

11. The apparatus according to claim 10, wherein:
    the singular value decomposition is applied to both a respective matrix D and a respective corresponding augmented matrix Db, defining $$R = \frac{\sigma_{min}(D)}{\sigma_{min}(Db)}$$

where $\sigma_{min}(D)$ and $\sigma_{min}(Db)$ stand for the smallest singular values of D and Db, respectively.

12. The apparatus according to claim 10, wherein the at least one processor for processing is configured to perform at least an affine transform in which parallel lines of an object represented in a plurality of the images remain parallel in the linear system after transformation.

13. The apparatus according to claim 10, the at least one processor for analyzing is configured to implement an algorithm in wherein a change in a perspective of camera acquiring the plurality of images with respect to objects represented in the plurality of images does not lead to a determination of independent motion.

14. The apparatus according to claim 10, wherein a change in relative positions of objects in the plurality of images leads the at least one processor for analyzing to produce a determination of independent motion.

15. The apparatus according to claim 10, wherein the at least one processor for processing receives said plurality of images a stream comprising a time sequence of images, and said output port is configured to produce the signal at least real time speed with respect to the time sequence.

16. The apparatus according to claim 10, wherein the plurality of images are received by the at least one processor for processing in an Motion Picture Experts Group 2 (ISO 13818-2) digital video format.

17. The apparatus according to claim 10, wherein the plurality of images are received the at least one processor for processing compressed in a digital video format which comprises blocks comprising arrays of image pixels, and macroblocks comprising arrays of the blocks, wherein the at least one processor for processing is further configured to estimate a motion parameter from a transformation at least one of said macroblocks over time, without rendering the compressed digital video data as a raster image.

18. A method of detecting independent motion in a plurality of stream of digitally compressed video data, the steps comprising:
a) selecting a pair of video frames from a stream of digitally compressed video data representing a three dimensional scene;
b) automatically building a linear system representing the three-dimensional scene for said pair of video frames using at least a three-dimensional to two-dimensional affine transform in which parallel lines remain parallel after affine transformation, and a change in camera position with respect to objects represented in the pair of video frames does not render the linear system inconsistent;
c) automatically analyzing said linear system represented in a matrix D to qualitatively determine the consistency thereof, substantially without quantitatively solving said linear system, based on a ratio of a singular value decomposition of a matrix D with respect to an associated augmented matrix Db, to determine a Rank; and
d) comparing the respective Ranks of a plurality of matrices D to determine independent motion therebetween, wherein:

$\dot{x}+\theta\dot{y}+\alpha x+\beta y+\gamma=0$ represents a linear constraint for each point at coordinates (x,y) with derivatives $\dot{x}$, $\dot{y}$, represented in the digitally compressed video data, wherein $\alpha$, $\beta$, $\gamma$, and $\theta$ are functions of both the motion parameters and affine transform parameters between respective frames of the digitally compressed video data.

19. The method according to claim 18, wherein Rank is defined such that a matrix A is of Rank r if it contains at least one square submatrix of order r with a non-zero determinant, while the determinant of any square submatrix having (r+1) or higher order, possibly contained in A, is zero, the equivalence of the of respective rank Rank(D) of the matrix D and rank Rank(Db) of an augmented matrix Db being determined by applying a Singular Value Decomposition to both matrix D and augmented matrix Db, defining $$R = \frac{\sigma_{min}(D)}{\sigma_{min}(Db)},$$

where $\sigma_{min}(D)$ and $\sigma_{min}(Db)$ stand for the smallest singular values of D and Db, respectively, and wherein a consistency of the linear system is concluded if R is above a predetermined threshold.

20. The method according to claim 18, wherein a change in camera position of a camera acquiring the video frames of the digitally compressed video data, with respect to objects represented in the time sequence of images does not render the linear system inconsistent, while a motion of one object with respect to another object renders the linear system inconsistent.

* * * * *